United States Patent [19]

Holmes

[11] Patent Number: 4,893,600
[45] Date of Patent: Jan. 16, 1990

[54] ADAPTIVE CONTROL FOR AN INTERNAL COMBUSTION ENGINE

[75] Inventor: Michael Holmes, Dorridge, United Kingdom

[73] Assignee: Lucas Industries plc, Birmingham, England

[21] Appl. No.: 212,319

[22] Filed: Jun. 27, 1988

[30] Foreign Application Priority Data

Jun. 27, 1987 [GB] United Kingdom ............... 8715130

[51] Int. Cl.$^4$ ..................... F02P 5/15; F02D 41/26
[52] U.S. Cl. .................................. 123/419; 123/417;
123/478; 364/148; 364/431.05
[58] Field of Search ............... 123/415, 416, 417, 418,
123/419, 425, 435, 436, 478, 480, 609; 364/148,
431.05, 431.08

[56] References Cited

U.S. PATENT DOCUMENTS

| | | | |
|---|---|---|---|
| 4,276,860 | 7/1981 | Capurka ........................ | 123/609 X |
| 4,306,284 | 12/1981 | Malcolm ........................ | 364/148 |
| 4,389,992 | 6/1983 | Shigematsu et al. ........... | 123/419 |
| 4,433,381 | 2/1984 | Wilkinson ...................... | 364/431.05 |
| 4,467,765 | 8/1984 | Suzuki et al. .................. | 123/419 |
| 4,479,476 | 11/1984 | Suzuki et al. .................. | 123/478 |
| 4,481,162 | 5/1984 | Ninomiya et al. .............. | 123/419 |
| 4,503,824 | 3/1985 | Ninomiya et al. .............. | 123/436 |
| 4,513,718 | 4/1985 | Ishii et al. ...................... | 123/425 |
| 4,535,406 | 8/1985 | Johnson ......................... | 364/431.08 |
| 4,539,957 | 10/1985 | Haraguchi et al. ............. | 123/425 |
| 4,575,800 | 3/1986 | Kittelson ....................... | 123/419 |
| 4,586,473 | 5/1986 | Nguyen ......................... | 123/419 |
| 4,653,449 | 3/1987 | Kamei et al. .................. | 123/478 |
| 4,691,286 | 9/1987 | Obayashi et al. .............. | 123/419 X |
| 4,706,196 | 11/1987 | Muramatsu et al. ........... | 364/431.05 |
| 4,715,344 | 12/1987 | Tomisawa ...................... | 123/489 |
| 4,799,469 | 1/1989 | Nagano et al. ................. | 123/419 X |

FOREIGN PATENT DOCUMENTS

| | | |
|---|---|---|
| 0044656 | 1/1982 | European Pat. Off. .. |
| 0234715 | 9/1987 | European Pat. Off. .. |
| 1257779 | 12/1971 | United Kingdom . |
| 2034930 | 6/1980 | United Kingdom . |
| 2042637 | 9/1980 | United Kingdom . |
| 2178195 | 2/1987 | United Kingdom . |

*Primary Examiner*—Willis R. Wolfe
*Attorney, Agent, or Firm*—Nixon & Vanderhye

[57] ABSTRACT

An adaptive control system and method is provided for a power producing engine having at least one control parameter which affects an engine output, where the engine has a drivetrain combination having at least one resonant frequency. A base value is established for one control parameter in accordance with engine operating conditions. The one control parameter is preferably perturbed about the base value in accordance with a perturbation waveform having a frequency greater than the at least one resonant frequency of the drivetrain. The perturbation waveform has a cycle including a first part and a second part. A positive perturbation is applied to the perturbed parameter during the first part of each cycle and a negative perturbation is applied to the perturbed parameter during the second part of each cycle. The engine output is monitored and the slope of the engine output is calculated with respect to at least one control parameter for the engine so as to obtain a desired value of the slope. In a preferred embodiment the perturbation frequency is greater than the resonant frequency of the drivetrain.

59 Claims, 9 Drawing Sheets

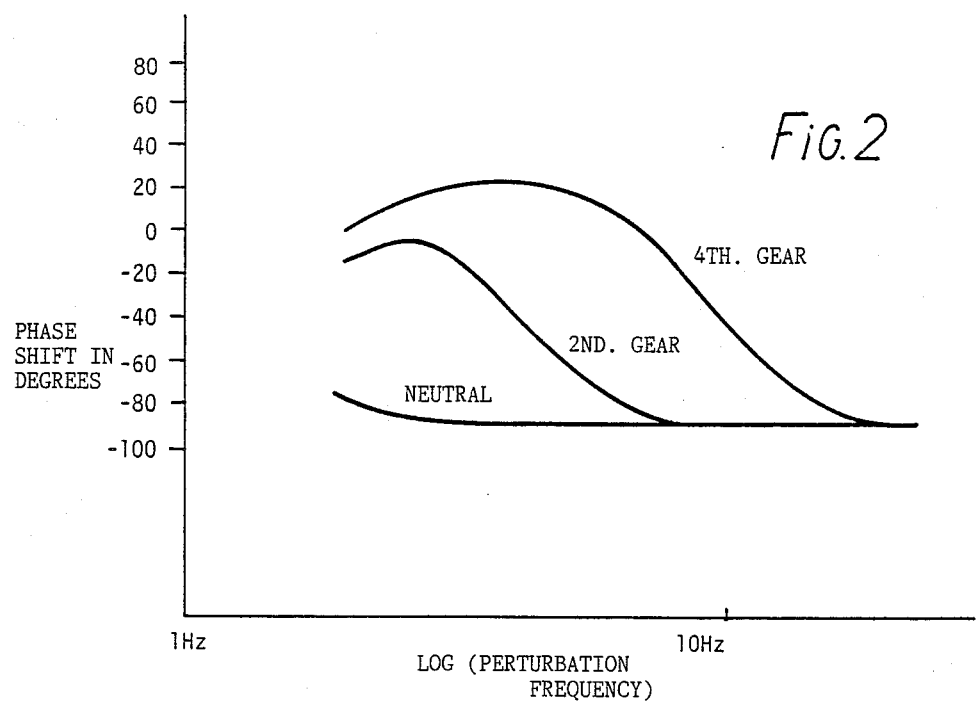
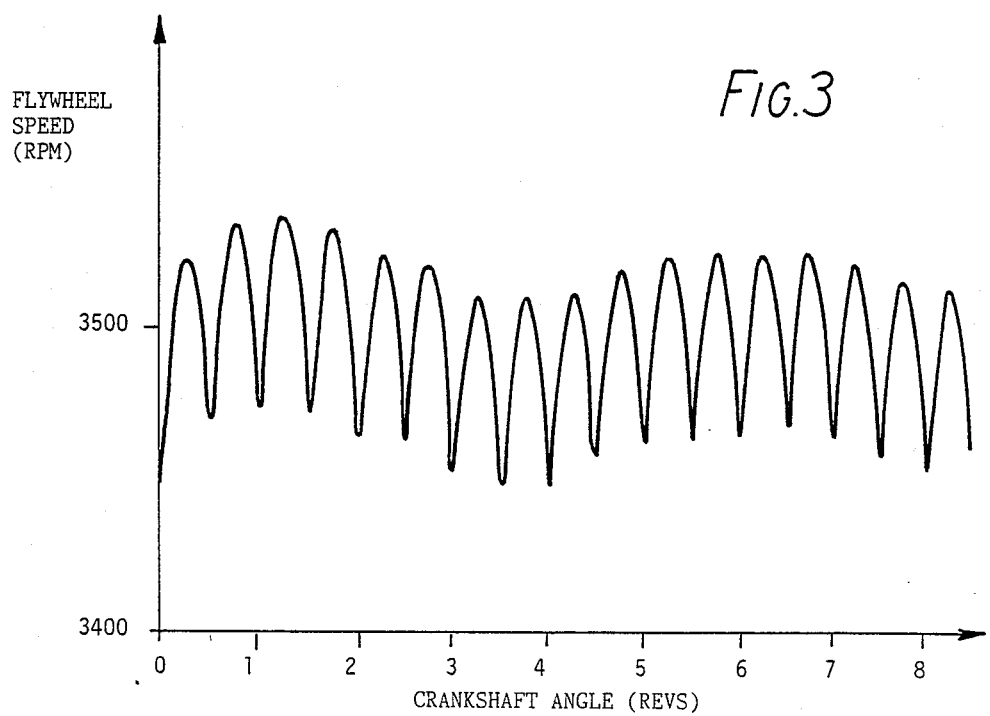

ADAPTIVE CONTROL FOR AN INTERNAL COMBUSTION ENGINE

FIELD OF THE INVENTION

This invention relates to an adaptive control system for an internal combustion engine and also to a method of controlling such an engine.

BACKGROUND OF THE INVENTION

In operating an internal combustion engine, it is necessary to establish values for various control parameters and, depending upon the particular control parameter, the value of the parameter may be varied continuously in accordance with one or more operating parameters of the engine.

In a spark ignition engine, for each ignition spark, or engine fire in one of the engine cylinders, it is necessary to control the spark advance so as to produce the peak combustion pressure soon after the piston has passed the top dead center position. Because the flame speed varies with the density of the air/fuel mixture, it is generally necessary to increase the spark advance angle with decreasing cylinder filling pressure. The spark advance angle must also be increased with increasing engine speed so as to allow for extra rotation of the engine crankshaft while the air/fuel mixture burns.

Until recently, the spark advance angle was established by a mechanical device responsive to manifold depression and engine speed. Such a mechanical device establishes the spark advance angle as a simple function of engine speed and load demand as represented by the manifold depression. Careful testing of engines shows that the optimum spark advance angle is a complex function of load and speed and this function cannot be matched by a mechanical device. Modern ignition systems now use empirically derived characteristics for the spark advance angle which are stored as a look-up table in a read only memory.

These spark advance characteristics are determined by testing a number of samples of an engine and establishing an optimum spark advance angle for each load/speed point.

Although this provides a much closer match to the optimum spark advance angle than was achieved with the mechanical devices, it still does not give the engine user the best possible spark advance angle for his engine throughout its life. There are a number of reasons for this. It is not possible to test enough engines to provide good statistics and the engines available during tests are often different from production engines. Also, variations in the engine characteristics may occur due to manufacturing tolerances and from small changes in engine design. During the life of an engine, various aging effects will occur in the engine and in the sensors, actuators and electronic circuitry and these will create a mismatch between the optimum characteristics and those stored in the read only memory.

In U.S. Pat. No. 4,575,800, incorporated herein by reference, there is described an adaptive control system for controlling the spark advance in a spark ignition engine or the fuel injection timing in a compression ignition engine. In the case of the spark ignition engine, small positive and negative perturbations are superimposed on the spark advance angle in synchronization with the operating cycle of the engine. The resulting changes in engine speed are used to determine the differential or slope of engine output with respect to spark advance angle. Each slope value is examined and these values are used to provide corrections to the spark advance angle with the intention of obtaining optimum values for the spark advance angle.

In the arrangement described in this patent, two perturbation patterns are described operating respectively at engine speeds from 0-2000 RPM and 2000-4000 RPM. In the first pattern, each half period of the perturbation cycle comprises one complete engine cycle and produces a range of perturbation frequencies from 0 to 8.3 Hz in the case of a four cylinder engine. In the second pattern, each half period of the perturbation cycle comprises two complete engine cycles and produces a range of perturbation frequencies from 4.2 to 8.3 Hz.

This arrangement suffers from the disadvantage that the range of perturbation frequencies produced can be either higher or lower than the resonance of the vehicle drivetrain in different gear ratios in a typical manual transmission vehicle. Consequently, there are large variations in the phase differences between the perturbation and the resulting changes in engine speed. This makes it difficult to obtain accurate values for the slope.

Arrangements are known which overcome this problem. A perturbation waveform is generated at a frequency slightly above the highest resonant frequency of the vehicle driveline and the frequency is varied so that each cycle of the perturbation waveform comprises a whole number of engine fire periods. With this arrangement, at certain engine speeds there is a synchronization of the waveform to the engine operating cycle which results in a particular cylinder continuously experiencing more perturbations of one type compared with other cylinders. Consequently, if a particular cylinder produces a higher torque than another cylinder, this will cause a bias in the measured values of the slope.

SUMMARY OF THE INVENTION

It is accordingly an object of this invention to provide a new or improved adaptive control system for an internal combustion engine and also a method of controlling such an engine in which the above-mentioned problems are overcome or reduced.

According to one embodiment of the invention, there is provided an adaptive control system for a power producing engine having at least one control parameter which affects an engine output, where the engine includes a drivetrain combination having at least one resonant frequency. The system includes means for establishing a base value for one control parameter in accordance with engine operating conditions. A perturbation generation means periodically perturbs the one control parameter about the base value in accordance with a perturbation waveform having a perturbation frequency greater than said resonant frequency of the drivetrain. The perturbation waveform has a cycle comprising a first part and a second part, with the perturbation means comprising means for applying a positive perturbation to said one control parameter during the first part of each cycle and a negative perturbation to said one control parameter during the second part of each cycle. A monitoring means monitors the engine output, and a slope calculation means, responsive to the monitoring means, calculates a slope of the engine output with respect to the one control parameter. A correction means, responsive to the slope calculations means, applies corrections to at least one of the control parameters so as to obtain a desired value of the slope.

According to another embodiment of this invention, there is provided an adaptive control system for an internal combustion engine having a flywheel connected through resilient shafting and a gear arrangement to a load, said flywheel, resilient shafting and gear arrangement forming a resonant system which has a particular resonant frequency for each gear ratio established by said gear arrangement, said adaptive control comprising means for determining a basic value for an engine control parameter (hereinafter referred to as "said perturbed parameter"); a perturbation generator for perturbing said perturbed parameter about said basic value, said perturbation generator generating a perturbation waveform and applying a positive type of perturbation to said perturbed parameter during the first part of each cycle of said waveform and a negative type of perturbation to said perturbed parameter during the second part of each cycle of the waveform, the frequency of said waveform being greater than the resonant frequency of said resonant system in the prevailing gear under normal driving conditions, and said waveform being arranged so that each cylinder of the engine experiences equal numbers of both types of perturbations compared with other cylinders irrespective of engine speed; means for monitoring an engine output, means for calculating the slope of engine output with respect to said perturbed parameter; and means for using said slope to apply a correction to at least one engine control parameter (each of which is hereinafter referred to as a "corrected parameter").

By using a perturbation waveform which has a frequency greater than the resonant frequency of the resonant system in the prevailing gear, the phase difference between the response in the engine speed and the perturbation waveform will not vary greatly between the different gear ratios established by the gear arrangement. By arranging the waveform so that each cylinder experiences equal numbers of both types of perturbations compared with other cylinders irrespective of engine speed, the danger of a particular cylinder continuously experiencing more perturbations of the same type than another cylinder is avoided.

At low engine speeds, it is impossible to maintain the frequency of the perturbation waveform above the required value. In the preferred embodiment, when the engine speed is below a predetermined value, no perturbations are applied to the perturbed parameter.

Preferably, for an engine having n cylinders, each cycle of said perturbation waveform comprises m engine fire periods with a perturbations of one type and m-a perturbations of the other type, a having a value which is a multiple of the highest common factor of n and m. The above refers to an engine having two types of perturbation, however it will be appreciated that a single type of perturbation can also be used to good effect. Preferably, when a corresponds to positive perturbations a is equal to, or less than, m/2. It is also preferable that m should be less than 2 n and most preferably less than n. This ensures each cylinder experiences equal number of both types of perturbations compared with other cylinders regardless of engine speed.

Conveniently, the system includes means for measuring the engine fire period corresponding to each perturbation, and said calculating means calculates each value of the slope from said fire periods. The calculating means may calculate each value of the slope from fire periods of a particular cylinder corresponding to both positive type and negative type perturbations.

In a preferred embodiment, said calculating means calculates each slope value by calculating a first value relating to the change in engine speed between a fire period of a particular cylinder corresponding to one type of perturbation and the immediately preceding fire period, calculating a second value relating to the change in engine speed between a previous fire period of said particular cylinder corresponding to the other type of perturbation and the immediately preceding fire period, both said immediately receding fire periods corresponding to said other type of perturbation, and then calculating the slope value as the difference between said first and second values.

The perturbed parameter may be an ignition timing parameter. The ignition timing parameter may be spark advance angle in the case of a spark ignition engine or fuel injection timing in the case of a compression ignition engine. There may be a single corrected parameter which is the same parameter as the perturbed parameter.

According to yet another embodiment of the invention, there is provided a method of controlling a power producing engine having at least one control parameter which affects an engine output, the engine having a drivetrain combination having at least one resonant frequency. The method includes establishing a base value for one of the control parameters in accordance with engine operating conditions, and periodically perturbing the one control parameter about the base value in accordance with a perturbation waveform having a frequency greater than said particular resonant frequency of the drivetrain. The perturbation waveform has a cycle comprising a first part and a second part, with a positive perturbation being applied to said one control parameter during the first part of each cycle and a negative perturbation being applied to said one control parameter during the second part of each cycle. The engine output is monitored, and a slope of the engine output is calculated with respect to the one control parameter which is perturbed. The method also includes applying corrections to at least one of the control parameters so as to obtain a desired value of the slope.

According to another embodiment of this invention, there is provided a method of controlling an internal combustion engine, said engine having a flywheel connected through a resilient shafting gear arrangement to a load, said flywheel, resilient shafting and gear arrangement forming a resonant system which has a particular resonant frequency for each gear ratio established by said arrangement, said method comprising the steps of: perturbing an engine control parameter (hereinafter referred to as "said perturbed parameter") by generating a perturbation waveform, applying a positive type of perturbation to said perturbed parameter during the first part of each cycle of said waveform and a negative type of perturbation to said perturbed parameter during the second part of each cycle of said waveform, the frequency of said waveform being greater than the resonant frequency of said resonant system in the prevailing gear under normal driving conditions, said waveform being arranged so that each cylinder of the engine experiences equal numbers of both types of perturbations compared with other cylinders irrespective of engine speed, calculating the slope of engine output with respect to said perturbed parameter from the response of engine output to said perturbations, and using said slope to apply a correction to at least one engine control parameter.

In controlling an internal combustion engine, it is desirable to obtain good fuel economy while keeping emissions of undesirable exhaust gases as low as possible. It is another object of this invention to provide an improved adaptive control system for an internal combustion engine with a view to achieving this.

According to a further aspect of this invention, there is provided an adaptive control system for an internal combustion engine, said control system comprising means for perturbing an ignition timing parameter about a basic value, means for monitoring an engine output, means for calculating the slope of engine output with respect to said ignition timing parameter, and means for controlling at least one input parameter so as to achieve a negative value of said slope during driving conditions, said negative value being a function of the vehicle operating conditions.

By operating an internal combustion engine with the slope of engine output with respect to an ignition timing parameter at a negative value, ignition timing is retarded relative to the timing which gives maximum engine output. However, the applicants have found that, by retarding ignition timing by a small amount, it is possible to obtain a significant reduction of the emission of nitrogen oxides with only a slight reduction of engine output. The negative slope may be a function of engine speed and load demand.

BRIEF DESCRIPTION OF THE DRAWINGS

The above and other objects, advantages and features of the invention will be more fully understood when considered in conjunction with the following discussion and the attached drawings, of which:

FIG. 2 is a graph illustrating the phase lag between a perturbation waveform and the resulting change in engine speed as a function of perturbation frequency;

FIG. 3 is a graph of engine speed as a function of crankshaft angle;

DETAILED DESCRIPTION OF THE DRAWINGS

Figure 1:
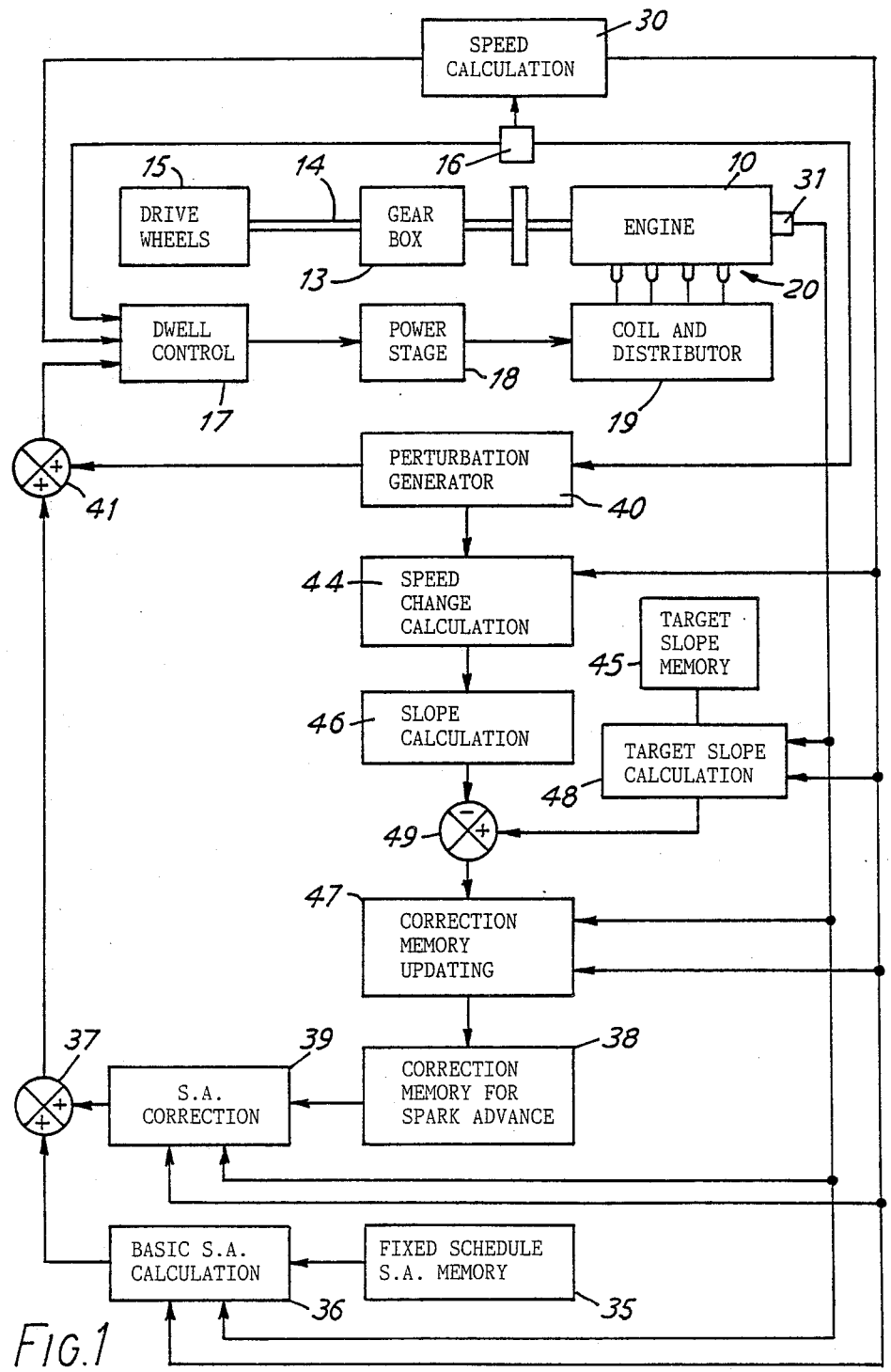
FIG. 1 is a diagram of the functional components of an adaptive control system embodying this invention.

Referring now to FIG. 1, there is shown in functional form an adaptive control system for a four cylinder spark ignition internal combustion engine 10 which is provided with a flywheel 11. Engine 10 is installed in a motor vehicle and is connected through a drivetrain comprising flywheel 11, a resilient shaft 12, a gear box 13, and a further resilient shaft 14 to drivewheels 15 which form a load. Although not shown, a clutch is also provided.

Flywheel 11 is associated with a position transducer 16 which produces a reference pulse for each 180° of rotation of the engine crankshaft. Each pulse is produced when the piston in the cylinder executing an expansion stroke is at 120° of crankshaft rotation after the top dead center position. The pulses from transducer 16 are supplied to a dwell control means 17, the output of which is connected through a power stage 18 to a coil and distributor 19. The coil and distributor 19 is connected to four spark ignition plugs 20 and causes ignition sparks to occur in these plugs at appropriate moments. The output of transducer 16 is also applied to a speed calculation means 30 which calculates engine speed and supplies this to the dwell control means 17.

Engine 10 is provided with a transducer 31 which measures the load demand to which the engine is subjected. In the present example, transducer 31 measures the depression or vacuum in the inlet manifold for the engine cylinders. The load demand could also be detected by measuring other quantities such as the throttle valve opening position or the rate of air flow into the inlet manifold.

The system also includes a fixed memory 35 in which is stored a two-dimensional array of spark advance angles, the abscissa and ordinate of the array corresponding to engine speed and load demand. Memory 35, speed calculation means 30 and transducer 31 are connected to a calculation means 36. For each prevailing engine speed and load demand, calculation means 36 calculates a basic value for spark advance and supplies this to one input of a summer 37.

Calculation means 36 calculates the basic value from the spark advance values stored in the array in memory 35 at the four points in the speed/load plane surrounding the prevailing engine speed and load demand by interpolation. Each of these values is multiplied by an appropriate weighting factor and the four resulting values are added to provide the basic spark advance value. Thus, calculation means 36 calculates the basic spark advance value by interpolation. The spark advance values are stored in memory 35 at a density which provides a good match for the irregularities of the true optimum spark advance characteristics of engine 10.

The spark advance values in memory 35 take the form of a fixed schedule which is established from rigtests on sample engines. For the various reasons which have been outlined above, the optimum spark advance values will differ from those stored in memory 35. As will shortly be described in detail, the system imposes small positive and negative perturbations on the spark advance value and senses the changes in engine output speed which these cause. From the changes in engine speed, correction values are calculated and stored in a correction memory 38. These correction values are also stored as a two-dimensional array in which the abscissa and ordinate represent engine speed and load demand, and they are stored with the same density as the values stored in memory 35.

For the prevailing engine speed, a correction value is calculated in a correction value calculation means 39 and is supplied to a second input of summer 37. Calculation means 39 receives the outputs of speed calculation means 30 and load demand transducer 31 and calculates the correction value for the prevailing engine speed and load from the values stored in memory 38 by using the same interpolation method as that used by calculation means 36.

The perturbation values are determined in a perturbation generator 40 and supplied to an input of a summer 41. The other input of summer 41 receives the output of summer 37, and the output of summer 41 is supplied to dwell control means 17 as a command value for the spark advance. Dwell control means 17 uses the output of speed calculation means 30 and position transducer 16 to ensure that ignition sparks occur at the commanded spark advance values.

Because ignition sparks occur intermittently in the spark ignition engine, the torque output of engine 10 fluctuates during each engine cycle. In order to smooth these fluctuations, flywheel 11 is provided and it converts the fluctuations in torque into small accelerations and decelerations. The resilient nature of shafts 12 and 14 percent these small accelerations and decelerations from causing changes in the speed of drivewheels 15.

Flywheel 11, shafts 12 and 14, and gear box 13 form a resonant system. The resonant frequency varies with the gear ratio established in gear box 13. In the present example, the system has a resonant frequency of 4 Hz in second gear and 9 Hz in fourth gear.

Every single perturbation in the spark advance angle causes a change in output torque produced by engine 10. In view of the resonant nature of flywheel 11 and shafts 12 and 14, the resulting change in the speed of flywheel 11 has two components. The first of these components is a damped ringing response at the appropriate resonant frequency and, in the particular engine mentioned above, the ringing decays with a time constant of 0.3 seconds. The second component is the longer term response which is associated with the new steady state which arises when the change in resistance forces caused by the change in vehicle speed match the change in torque from the engine. With the particular engine discussed above, this second component has a time constant of 7 seconds in fourth gear.

It is desirable to provide a system which will work in any gear and which will provide comparable results in the different gears without knowledge of which particular gear is engaged, i.e., no information is provided to the system as to the gear. In FIG. 2, there is shown a graph of the phase shift between a perturbation waveform generated by perturbation generator 40 and the resulting change in engine speed as a function of perturbation frequency for fourth gear, second gear and neutral. As may be seen, the phase shift changes rapidly with frequency in the region below the 9 Hz and there are also large differences between the phase shift in the different gears. In contrast, in the region above 10 Hz, the phase shift changes slowly with frequency and the differences in phase shift in the different gears are small. With increasing frequency, for all gears the phase shift approaches the 90° phase shift obtained when neutral is engaged. In order to provide comparable results in the different gears, it is desirable to maintain the perturbation frequency produced by perturbation generator 40 at a value greater than the resonant frequency of the resonant system formed from flywheel 11, shafts 12 and 14 and gear box 13 in the prevailing gear. In the present case as will be explained, the perturbation frequency is kept above the resonant frequency under normal driving conditions.

Perturbation generator 40 generates a two level waveform. During the first part of each perturbation cycle, perturbation generator 40 applies a small positive perturbation, namely +3.75°, to the spark advance angle. During the second part of each cycle, perturbation generator 40 applies a small negative perturbation, namely −3.75°, to the spark advance angle. Because perturbations can take effect only when ignition is effected, each part of the cycle must have a duration equal to a whole number of engine fire periods. In the present example, the first part of each cycle has duration equal to one fire period and the second part has a duration equal to two fire periods. The reason for this is explained below.

Figure 8:
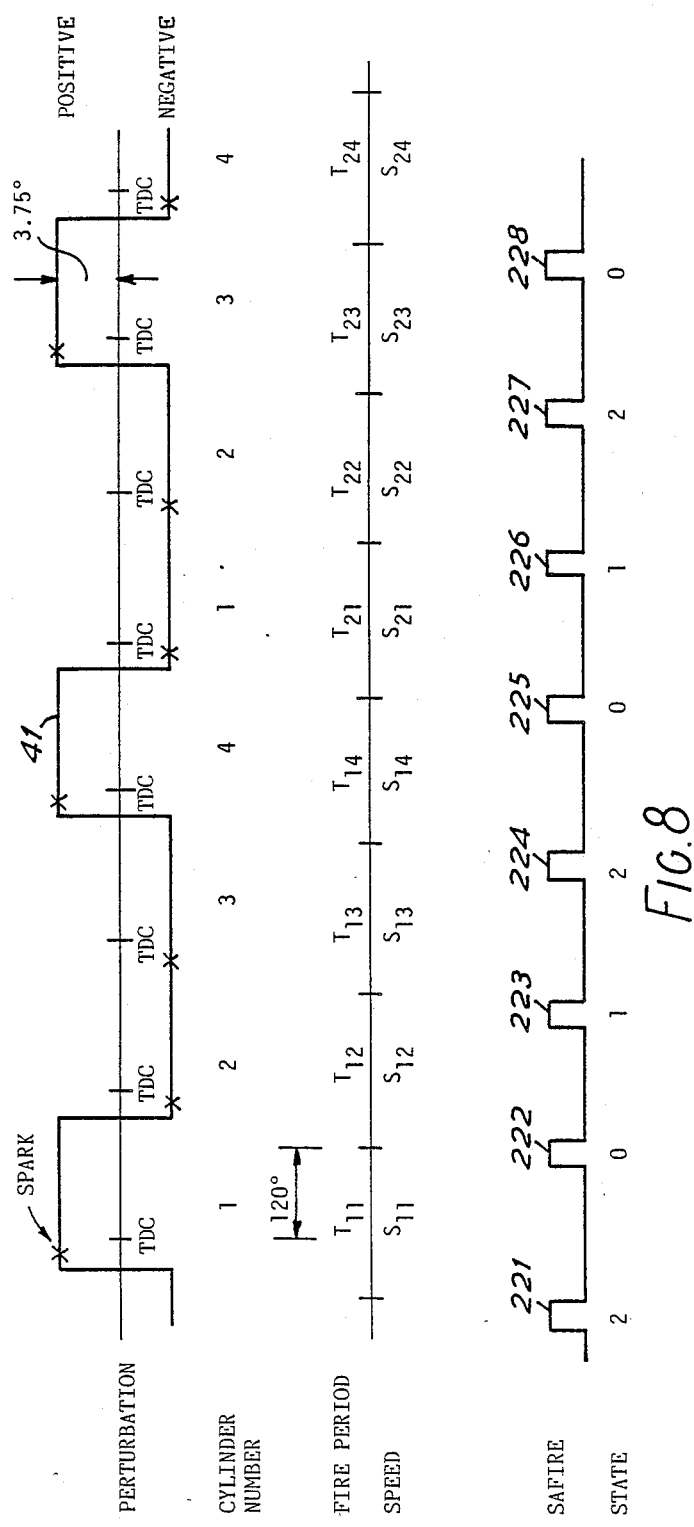
FIG. 8 is a timing diagram for the control system of FIG. 1.

An example of the perturbation waveform is illustrated in FIG. 8 and indicated by reference numeral 41'. In FIG. 8, the time of each spark is indicated by a star and the top dead center positions of the pistons are indicated by "TDC". The number of the cylinder undergoing an expansion stroke is written below waveform 41'.

With the perturbation waveform of FIG. 8, the perturbation frequency is directly proportional to the engine speed. At an engine speed of 1000 rpm, the perturbation frequency is 11 Hz. Referring to FIG. 2, at 11 Hz, the phase shift in all gears is close to 90°. Thus, at engine speeds above 1000 rpm the phase shift remains stable. Between an engine speed of 1000 rpm and an engine speed of 600 rpm, which corresponds to a perturbation frequency of 6.7 Hz, the phase shift moves significantly away from 90° in fourth gear. However, engine speeds below 1000 rpm do not represent normal driving conditions in fourth gear as they would cause the engine to stall. Below 600 rpm, the phase shift moves away from 90° in the remaining gears. At engine speeds below 600 rpm, perturbation generator 40 ceases to apply perturbations to the spark advance angle. Thus, in the present example the perturbation frequency stays above the resonant frequency in the prevailing gear under normal driving conditions.

As mentioned above, position transducer 16 produced a reference pulse when the respective piston is at 120° after the top dead center position. Thus, each calculation of engine speed in speed calculation means 30 corresponds to the average speed during 180° of crankshaft rotation, the end of this 180° of rotation lagging the start of the expansion stroke of the corresponding cylinder by 120°. There are two important reasons for measuring the speed in this way.

Firstly, referring to FIG. 3, there is shown the variation in the speed of flywheel 11 as a function of crankshaft angle. As may be seen during each engine cycle, severe fluctuations occur. There is therefore a danger that the severe fluctuations in engine speed could confuse measurements in engine speed caused by the perturbations to the spark advance angle. By calculating the engine speed from the duration of 180° rotation of the crankshaft, this danger is avoided.

Secondly, the 120° lag between the measured rotation of the crankshaft and the corresponding expansion stroke allows for the phase shift between the perturbation and the resulting change in engine speed. Although it has been stated above that the phase shift approaches 90°, it is not essential for the lag between the expansion stroke and the measured 180° crankshaft rotation to be exactly 90° of the perturbation cycle, and applicants have found that satisfactory results are obtained when this lag is 120° of crankshaft rotation.

For convenience, these measured periods will be referred to as "fire periods." These fire periods are shown in FIG. 8 and are denoted by $T_{11} \ldots T_{24}$. The corresponding engine speeds are denoted by $S_{11} \ldots S_{24}$.

Referring again to FIG. 1 the output of speed calculation means 30 is supplied to a speed change calculation means 44. Speed change calculation means 44 calculates and stores the speed change due to each perturbation.

For example, for the first negative perturbation to the spark advance angle for cylinder number 4 shown in FIG. 8, the speed change is calculated as $S_{14} - S_{13}$.

The values calculated in speed change calculation means 44 are supplied to a slope calculation means 46. Each value of the slope is calculated by taking a first value which corresponds to the speed change resulting from applying a positive perturbation to the spark advance angle of a particular cylinder, taking a second value which corresponds to the speed change resulting from applying the previous negative perturbation to the spark advance angle of the same particular cylinder, and then calculating the slope by subtracting the second value from the first value.

For example, referring to FIG. 8, following the positive perturbation to cylinder number 3, the slope is calculated as follows:

first value $= (S_{23} - S_{22})$ second value $= (S_{13} - S_{12})$ slope $= (S_{23} - S_{22}) - (S_{13} - S_{12})$ By calculating the slope in this way, the result is not affected by linear acceleration or deceleration of engine speed. This arises because there will be a component for the acceleration or deceleration present in each of the values $(S_{23} - S_{22})$ and $(S_{13} - S_{12})$, and these components will cancel in the formula for the slope.

In the formula given above for the slope, the slope is calculated for each cylinder in turn. This provides the advantage that the spark advance angle may be corrected on a cylinder-by-cylinder basis.

By way of modification, the slope may be calculated from the average engine speeds for each type of perturbation. For example, referring to FIG. 8, a value for the slope may be calculated as follows:

slope $= S_{14} - (S_{12} + S_{13})/2$

This formula has the disadvantage that the resulting value of the slope is affected by linear acceleration and it does not permit the slope to be calculated for each cylinder in turn.

The slope may also be calculated by:

slope $= S_{14} - (S_{13} + S_{21})/2$

With this formula, the resulting value of slope is not affected by linear acceleration.

In an internal combustion engine, it may happen that a particular cylinder produces more torque than the other cylinders. If a perturbation waveform causes a positive (or negative) perturbation to be applied more often to the spark advance angle of this cylinder than other cylinders, there will be a bias in the calculated value of the slope.

With the perturbation waveform shown in FIG. 8, positive and negative perturbations are applied alternately to each cylinder. Thus, the danger of a bias in the calculated value of the slope is avoided.

The waveform shown in FIG. 8 does not represent the only waveform which avoids the danger of bias. For example, with an engine which has n cylinders and a two level perturbation waveform which has a duration of m engine fire periods, the danger of bias is avoided if the duration of the first part of each cycle of the waveform has a duration of a fire periods, where a is a multiple of the highest common factor of n and m. It will be appreciated that a single type of perturbation relative to the bias value for the engine control parameter could also be used to good effect. Such perturbation would be created in FIG. 8 for example by arranging one extremity of the perturbation to be coincident with the base value. Preferably, the number of positive perturbations is equal to, or less than, m/2. Also it is desirable to have m as small as possible—at least less than 2 n and preferably less than n.

Figure 9A:
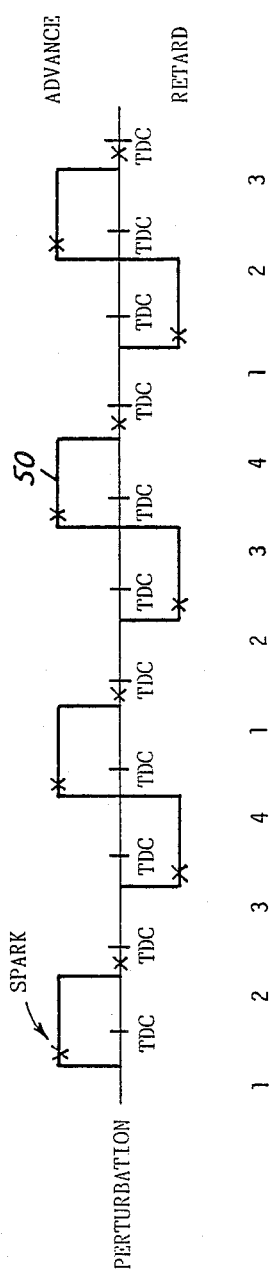
FIGS. 9a and 9b are timing diagrams for 4 and 6 cylinder embodiments of this invention.
Figure 9B:
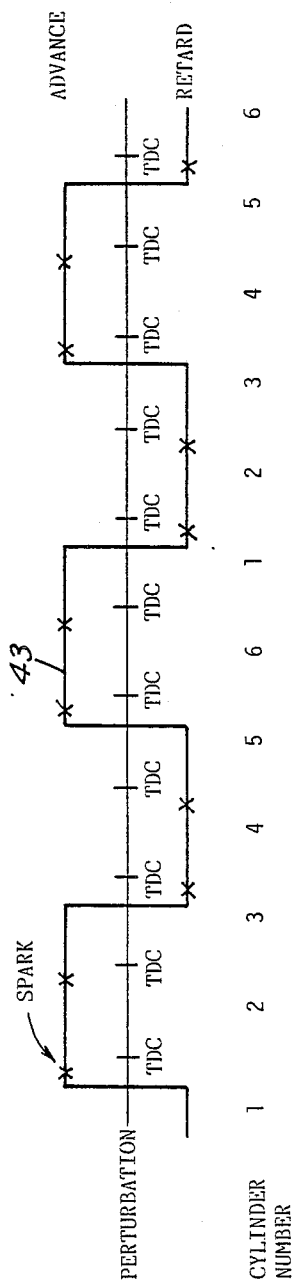

An example of suitable perturbation waveforms for four cylinder and six cylinder engines are shown in FIGS. 9a and 9b, respectively and are indicated by reference numerals 50 and 43, respectively. In the example of FIG. 9a each cycle of the perturbation waveform has a duration of three engine fire periods and in the example of FIG. 9b each cycle of the perturbation waveform has a duration of four engine fire periods. In FIG. 9a each part of the three level waveform has a duration of one engine fire period whereas in FIG. 9b, each part (half) of each cycle has a duration of two engine fire periods.

The following Table shows quantified values for the examples provided

| FIG. No. | m | n | Highest Common Factor | No. of Perturbed Fires (Perturbations) |
|---|---|---|---|---|
| 8 | 3 | 4 | 1 | 3 |
| 9a | 3 | 4 | 1 | 2 |
| 9b | 4 | 6 | 2 | 4 |

In each case it will be seen that $m < 2n$.

In the case of the arrangement described in said U.S. patent application No. 139,301 mentioned above, the danger of a bias in the calculated slope may be eliminated by introducing an additional fire period into the perturbation waveform at periodic intervals.

The curve relating torque output to spark advance has a single maximum at which the slope of engine output with respect to spark advance is zero. Examples of such curves are found in copending U.S. patent application Ser. No. 888,067 (filed July 22, 1986); U.S. Ser. No. 016,790 (filed February 20, 1987); U.S. Ser. No. 130,620 (filed December 9, 1987); U.S. Ser. No. 139,301 (filed December 29, 1987); and U.S. Ser. No. 143,508 (filed January 13, 1988) each of which is incorporated herein by reference. In presently known adaptive control systems, the spark advance angle is corrected with the intention of achieving this maximum. However, applicants have found that, if the spark advance angle is corrected so as to achieve a small negative value for the slope, the emissions of nitrogen oxides are signficantly reduced at the cost of only a small loss of engine output. In the present example, the spark advance angle is corrected so as to achieve such a value as described below.

In FIG. 1, the slope calculated by slope calculation means 46 is compared by summer 49 with a target slope value obtained from target slope calculation means 48 and the slope error is supplied to correction memory updating means 47. Target slope calculation means 48 calculates the target slope value from a target slope memory 45 using the same method of interpolation that is used to calculated the basic spark advance by basic spark advance calculation means 36. Target slope memory 45 is a two-dimensional array of different slope values as a function of load and speed. The slope value at any individual load and speed is determined by engine testing to give the optimum compromise between engine output and emissions of nitrogen oxides. Correction memory updating means 47 also receives the engine speed and load demand from speed calculation means 30 and load transducer 31. For each slope measurement, updating means 47 updates the values stored in memory 38 for each of the four array points surrounding the prevailing engine speed and load demand. Specifically, for each array point a new correction is calculated and stored from the old correction in accordance with the following formula:

$$\text{new correction} = \text{old correction} = k_1 \times (\text{weighting factor}) \times (\text{slope} + \text{target slope})$$

where $K_1$ is a constant and target slope is the magnitude of the required negative value of the slope.

This formula corrects the values in memory 38 from the slope measurements by integration and smooths out the noise component in the slope measurements. The constant $k_1$ should be chosen so as to be small enough to reduce these noise components to a low level but large enough to provide rapid convergence to the optimum spark advance angle. The weighting factor given in this formula is the same as the weighting factor used by correction calculation means 36 and 39. The method of calculating the correction factor will be described in detail below.

As the density of array points in memory 35 is chosen to give a good match with the optimum spark advance characteristics, the information in the slope measurements will represent a mismatch which has occurred between the actual optimum characteristics and those stored in memory 35. It is therefore reasonable to update memory 38 by a process which is symmetrical with the interpolation process used to derive the spark advance angle and the formula given above achieves this. Furthermore, in the formula given above, the values stored in memory 38 are corrected in proportion to the magnitude of each slope measurement, and so maximum advantage is taken of the information present in each slope measurement.

The combination of the rapid method of making slope measurements which is achieved by using the perturbation waveform of FIG. 8 and the formula given above for updating memory 38 permits the spark advance angle to be corrected to its true optimum value for the complete range of engine speed and load demands in approximately six hours of driving a motor vehicle in mixed road conditions. It is preferred that memory 38 is of a non-volatile construction, so that the corrections are retained between periods of engine operation. Thus, memory 38 contains a complete schedule of updated corrections addressed by engine speed and load demand.

Two further refinements to the formula given above for updating memory 38 will now be described.

In addition to the mismatch in the spark advance angle for the prevailing speed and load demand, each slope measurement may also contain information which refers to the whole speed/load demand plane. For example, there may be a mismatch for a spark advance across the entire plane due, for example, to changes in barometric pressure or in the composition of fuel. In order to take advantage of this information, each slope measurement may be used to update all the correction values in memory 38 in accordance with the following formula:

$$\text{new correction} = \text{old correction} + k_2 \times (\text{slope} + \text{target slope})$$

Alternatively, this formula may be used to update a single value which is added at summer 37 to the correction value calculated by calculation means 39.

The constant $k_2$ is of course much smaller than the constant $k_1$ mentioned above. However, the constant $k_2$ must be chosen to be large enough to given convergence for changes in variables such as a barometric pressure in a few minutes across the entire load/speed plane.

The second refinement enables the entire spark advance characteristics to be tilted and this may be required, for example, when position transducer 16 is poorly calibrated or subject to drift. With this second refinement, four offset correction values are stored in an additional memory corresponding to the four corners of the speed/load plane. Each slope measurement is then used to update these four values by multiplying the slope by an appropriate weighting factor and an appropriate constant. In calculating each correction value, these four offset values are then multiplied by appropriate weighting factors and the resulting value is added to the value calculated from the four array points surrounding the prevailing engine speed and load demand.

As mentioned above, by using the perturbation waveform of FIG. 8 and the method of slope calculation performed by slope calculation means 46, the slope is available for each cylinder. By way of modification, there may be provided an individual correction memory for each cylinder, each correction memory being updated using the formula given above and, if desired, with one or both of the two refinements.

Figure 4:
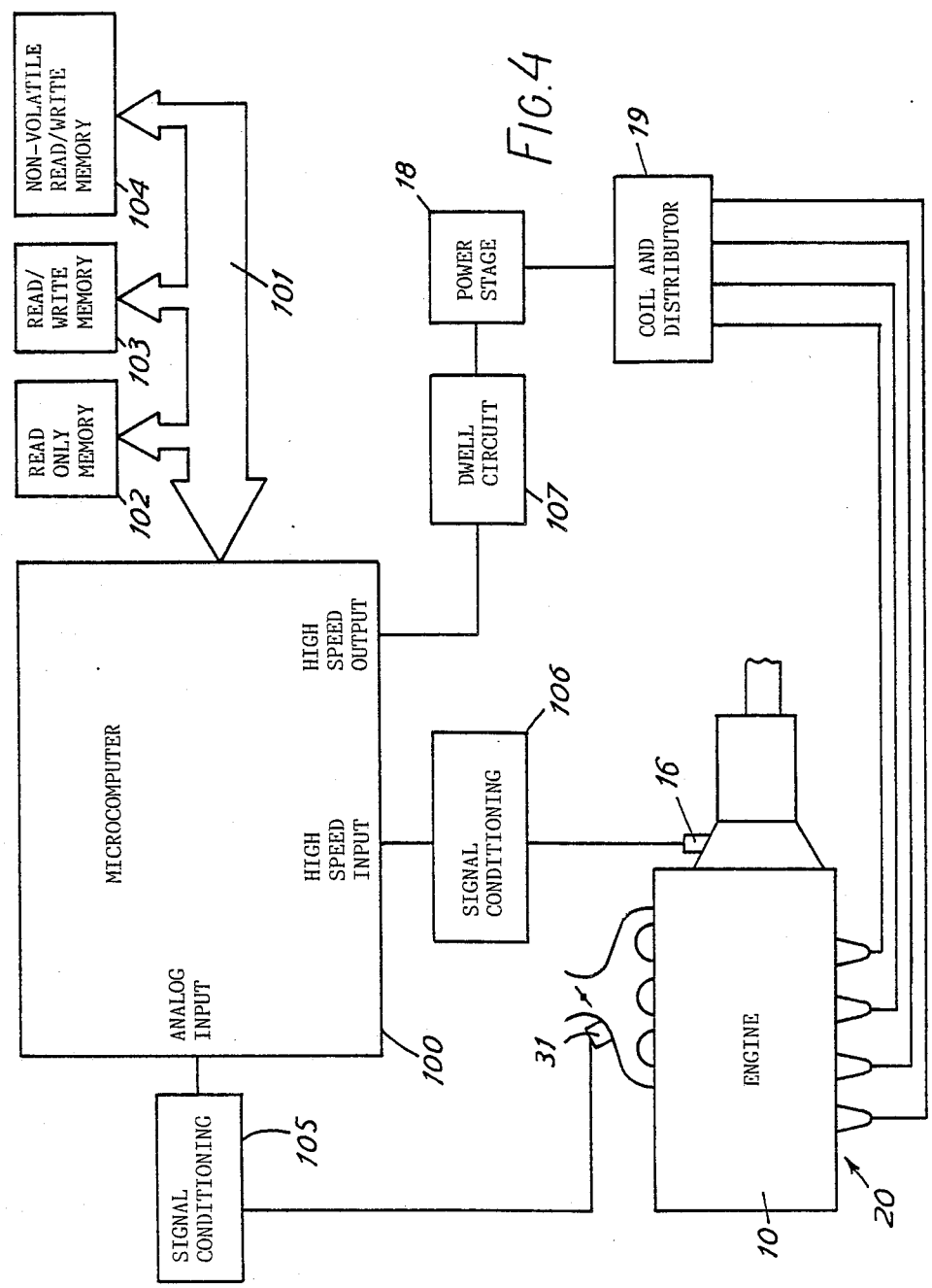
FIG. 4 is a block diagram of a microcomputer arrangement which implements the functional components of FIG. 1.

The various functional blocks shown in FIG. 1 are implemented using a microcomputer arrangement, and this arrangement is shown in FIG. 4. The microcomputer arrangement comprises an Intel Corporation 8097 microcomputer 100 which is connected via a data and address bus 101 to a type 27C64 Read Only memory 102, a Hitachi type 6116 Read/Write memory 103, and a Greenwich Instruments Limited type NVR2 Non-Volatile Read/Write memory 104. The program and fixed schedules are stored in memory 102, temporary variables are stored in memory 103, and the corrections for the spark advance angle are stored in memory 104.

The microcomputer arrangement implements speed calculation means 30, perturbation generator 40, speed change calculation means 44, slope calculation means 46, updating means 47, memories 35 and 38 together with calculation means 36 and 39, summers 37 and 41 and part of dwell control means 17.

Load demand transducer 31 is connected through a conventional signal conditioning circuit 105 to an ANALOG input of microcomputer 100. Position transducer 16 is of the variable reluctance type and coacts with a toothed wheel mounted on the engine crankshaft and from which teeth have been removed to establish the required reference positions. Transducer 16 is connected through a signal conditioning circuit 106 to a HIGH SPEED input of microcomputer 100.

A HIGH SPEED output of microcomputer 100 is connected to the input of a dwell control circuit 107.

Dwell control circuit 107 together with part of the program stored in memory 102 perform the function of the dwell control means 17 of FIG. 1. Dwell control circuit 107 is a type L497 dwell control circuit supplied by S.G.S. Limited. Dwell control circuit 107 initiates the buildup of current in the primary winding of the ignition coil at the correct moment to achieve the required level just before the current is interrupted. Dwell control circuit 107 also limits the coil current to the required level during the short period which elapses in between achieving the required current and the current being interrupted. The output of dwell control circuit 107 is connected to power stage 18 which, as mentioned with reference to FIG. 1, is connected to the input of coil and distributor 19.

Figure 5:
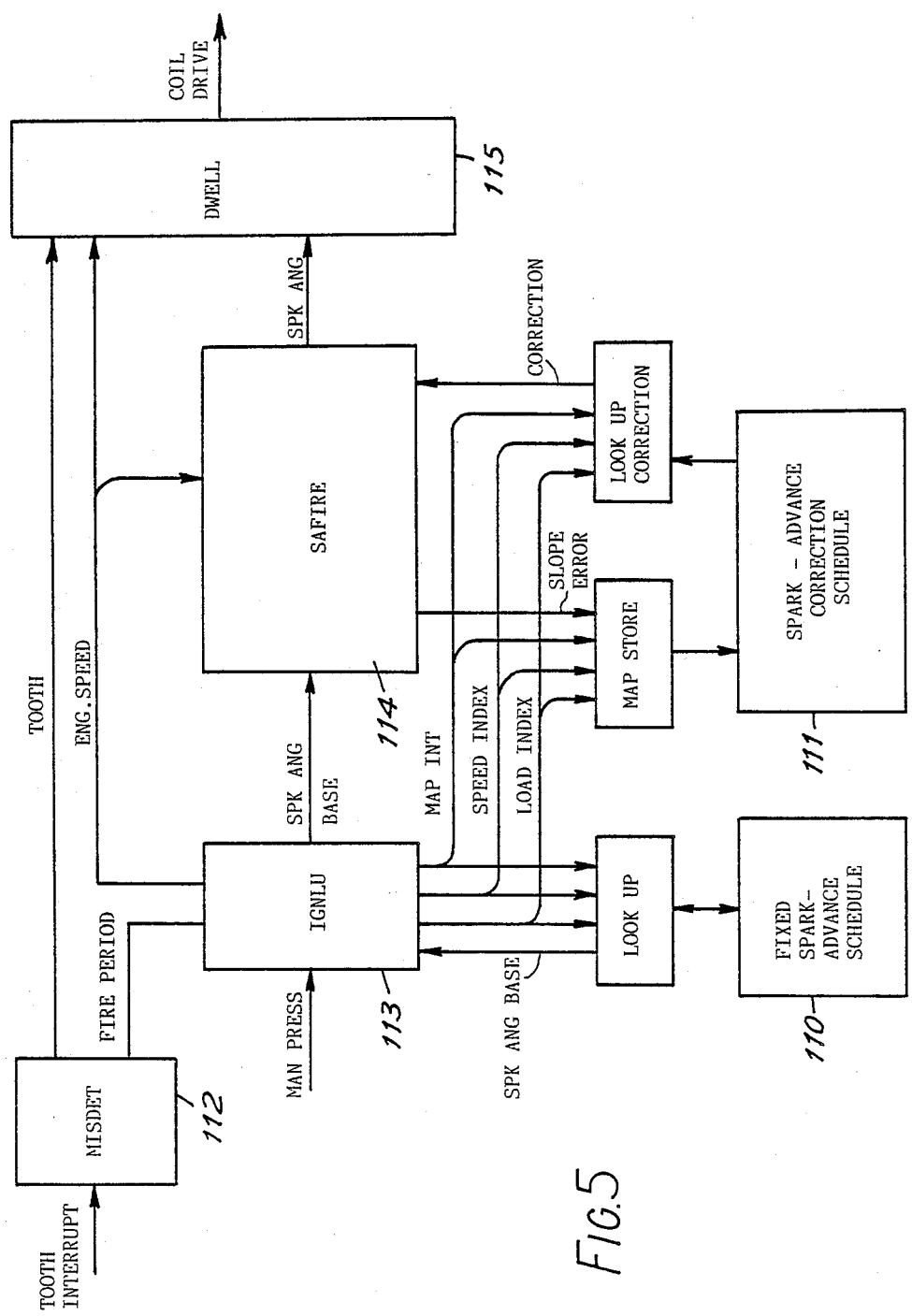
FIG. 5 is a layout diagram of the computer program forming part of the control system of FIG. 4.

Referring now to FIG. 5, there is shown the general arrangement of the modules which form the program and also the flow of data between these modules. The program comprises modules MISDET 112, IGNLU 113, SAFIRE 114, and DWELL 115. The module IGNLU calls a sub-module LOOK UP and the module SAFIRE calls sub-modules MAP STORE and LOOK UP CORRECTION. Although not shown, SAFIRE also calls a sub-module LOOK UP TARGET SLOPE. FIG. 5 also shows a fixed spark-advance schedule 110 which contains the fixed spark advance values and which corresponds to memory 35 shown in FIG. 1. FIG. 5 further shows a spark-advance correction schedule 111 which contains the correction values for spark advance and corresponds to memory 38 shown in FIG. 5.

The module MISDET receives an interrupt signal TOOTH INTERRUPT and this module is executed each time a tooth is detected. A variable TOOTH is supplied to the module DWELL and represents the position of the crankshaft to within one tooth of transducer 16. This module MISDET compares the period between each tooth and thereby detects the missing teeth. When a missing tooth is detected, this module re-establishes the relationship between the variable TOOTH and absolute position of the crankshaft. The module MISDET also calculates the fire period as the period between teeth at 120° ATDC and supplies this as a variable FIRE PERIOD to the module IGNLU. The module IGNLU receives a variable MAN PRESS representing manifold pressure which is indicative of the load demand. The variable MAN PRESS is derived from the output signal of transducer 31 by an analog/digital converter which forms part of microcomputer 100. The module IGNLU also calculates a variable ENG SPEED representing engine speed and supplies this to SAFIRE and DWELL.

In each of schedules 110 and 111, the spark advance values are stored as a 16×16 array. In each array, the abscissa and ordinate correspond respectively to engine speed and load demand and the abscissa and ordinate are divided respectively into 16 discrete engine speed and load demand values. Thus, each array point contains the spark advance value for one of the discrete engine speed and one of the discrete load demand values.

In order to address schedules 110 and 111, the module IGNLU generates address variables SPEED INDEX and LOAD INDEX corresponding respectively to engine speed and load demand. Each of these address variables can assume any of the values 0 to 15 corresponding to the lower 16 discrete engine speed and load demand values. These variables are set to the value corresponding to the engine speed and load demand immediately below the prevailing speed and load demand. The address variables SPEED INDEX and LOAD INDEX are supplied to the sub modules LOOK UP, MAP STORE, and LOOK UP CORRECTION.

The module IGNLU also calculates four variables MAP INT 0 to 3 which represent the four weighting factors described above. The four variables MAP INT 0 to 3 correspond respectively to the four addresses (SPEED INDEX, LOAD INDEX), (SPEED INDEX+1, LOAD INDEX), (SPEED INDEX, LOAD INDEX+1,), (SPEED INDEX +1, LOAD INDEX +1).

Figure 6:
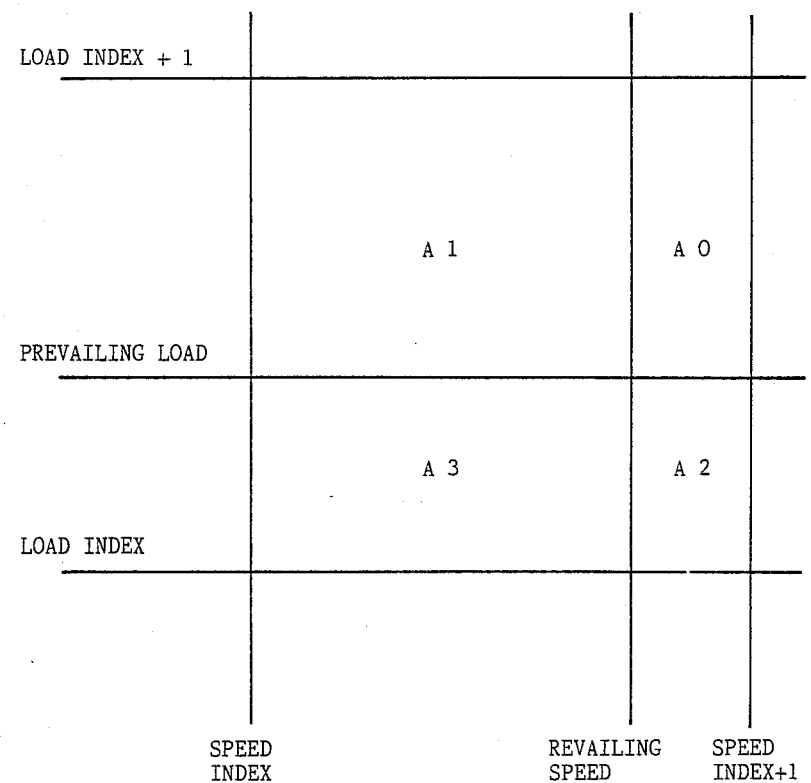
FIG. 6 is a diagram illustrating the calculation of weighting factors used in the program.

The method of calculating the weighting factors MAP INT 0 to 3 for prevailing speed and load is shown in FIG. 6. A main rectangle is formed in the speed/load plane, the corners of the rectangle lying at addresses (SPEED INDEX, LOAD INDEX), (SPEED INDEX +1, LOAD INDEX), (SPEED INDEX, LOAD INDEX +1), (SPEED INDEX +1, LOAD INDEX +1). This main rectangle is divided into four sub-rectangles by drawing the abscissa and ordinate passing through the prevailing speed and load demand, these sub-rectangles having areas A0, A1, A2, A3. The weighting factor for each of the four array points is calculated by dividing the area of the sub-rectangle diagonally opposite the array point by the area of the main rectangle. Thus, the weighting factors MAP INT 0 to 3 have the following values:

MAP INT 0=A0/A

MAP INT 1=A1/A

MAP INT 2=A2/A

MAP INT 3=A3/A where A=A0+A1+A2+A3.

The module IGNLU calls the sub-module LOOK UP which calculates the basic spark advance angle as a variable SPK ANG BASE by the interpolation process which has been described above. SPK ANG BASE defines the spark advance angle with reference to rotation of the crankshaft beyond a datum position. Thus, with increasing spark advance angle, the value of SPK ANG BASE decreases. The module IGNLU then supplies the variable SPK ANG BASE to the module SAFIRE.

The module IGNLU is executed each time a missing tooth is detected and the module SAFIRE is executed after module IGNLU.

Figure 7A:
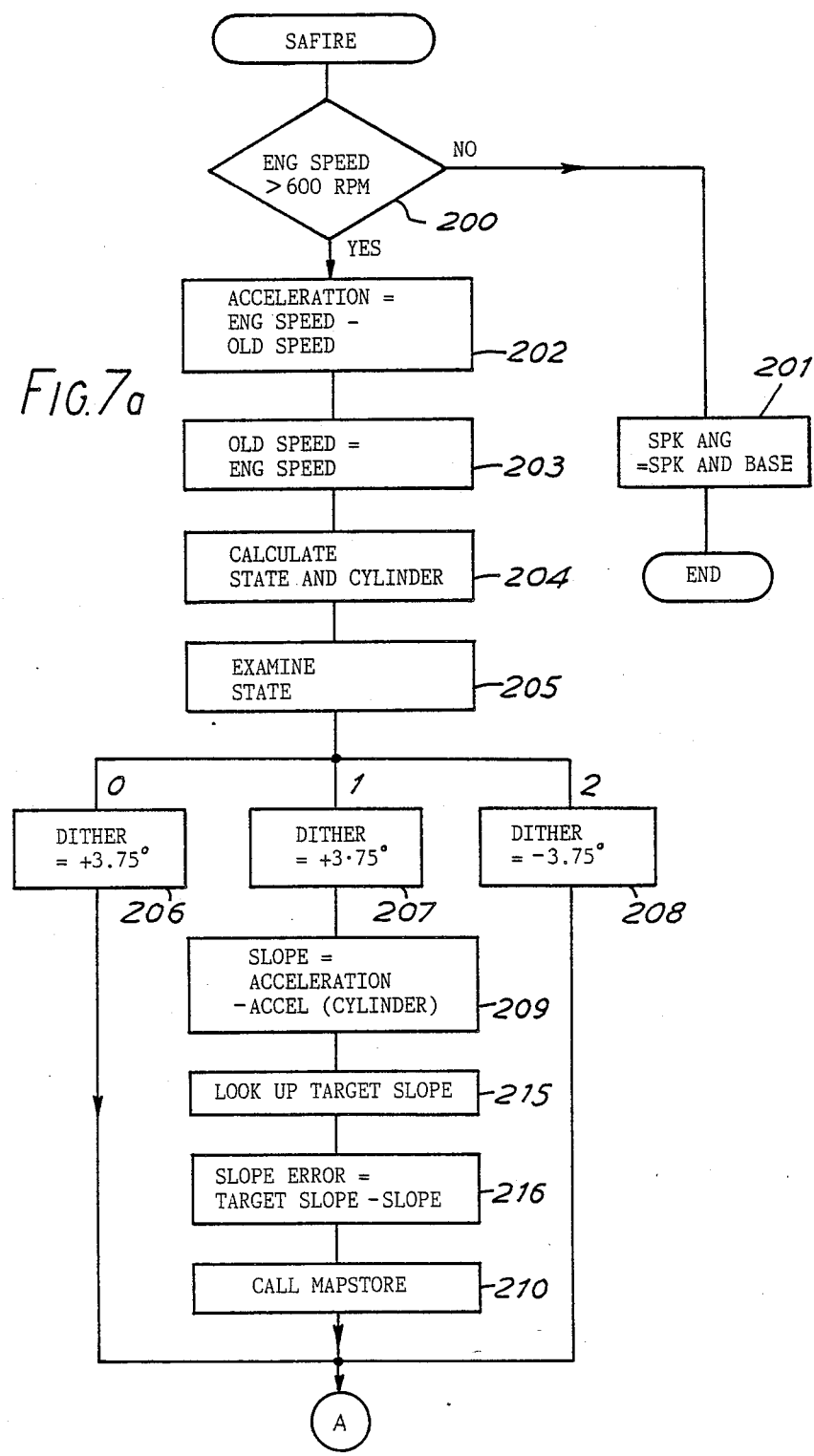
FIGS. 7a and 7b are flow charts of part of the program.
Figure 7B:
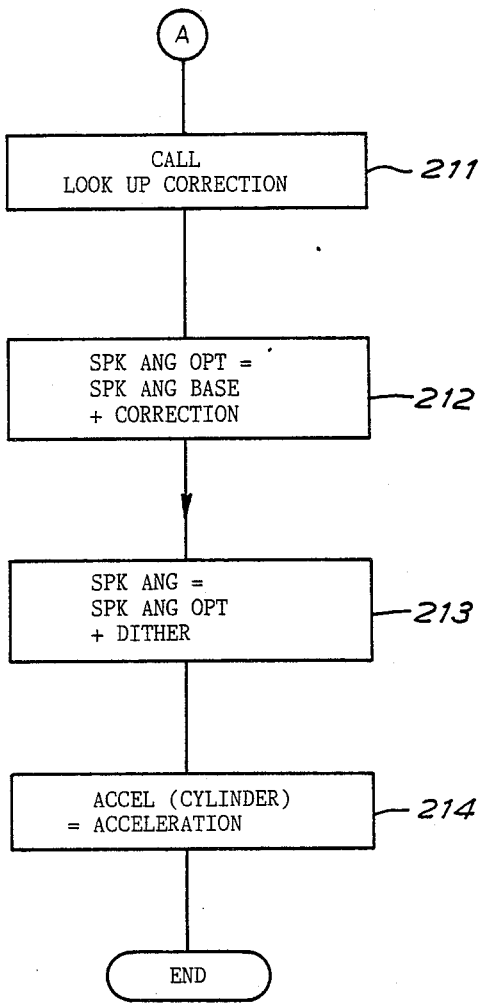

The module SAFIRE generates the perturbation waveform, determines each perturbation to the spark advance angle, calculates the change in engine speed resulting from each perturbation, and calculates the slope of engine output with respect to spark advance as a variable STORE. This module uses the slope measurement compared with the target slope value to produce a variable SLOPE ERROR to update the spark advance correction schedule and retrieves a correction value to the spark advance from this schedule. This module also sums the basic spark advance value SPK ANG BASE with the perturbation value and the calculated correction value to produce a spark command value SPK ANG for the spark advance angle and supplies this to the module DWELL. This module will now be described with reference to the flow chart shown in FIG. 7.

After entering the module SAFIRE, in a step 200, the variable ENG SPEED is examined. If the engine speed is less than 600 rpm, in a step 201 SPK ANG is set to SPK ANG BASE and no perturbation is made. If the engine speed is greater than 600 rpm, the program continues with a step 202.

In step 202, a variable ACCELERATION is calculated as (ENG SPEED-OLD SPEED). OLD SPEED is a variable representing the value of ENG SPEED available to the module SAFIRE during its previous execution. In FIG. 8, successive executions of the module SAFIRE are indicated by reference numerals 221 to 228. Thus, for example, during the execution of SAFIRE indicated by 225, the variable ACCELERATION is given a value of $S_{13}-S_{12}$. This corresponds to the change in engine speed caused by the perturbation established during the execution of SAFIRE indicated by 223. In general, the variable ACCELERATION corresponds to the change in engine speed caused by the perturbation established in the last but one execution of SAFIRE.

After step 202, the variable OLD SPEED is set to ENG SPEED in step 203. The program then continues with a step 204.

In step 204, variables STATE and CYLINDER are calculated. As previously mentioned, each cycle of the perturbation waveform comprises three engine fires and the variable STATE has values of 0, 1, 2 corresponding to the first, second and third fires of each cycle. When STATE has values of 0 and 1, the module SAFIRE establishes negative perturbations to the spark advance angle, and, when STATE has a value of 2, it establishes a positive perturbation. The values of STATE are shown in FIG. 8. CYLINDER is the number of the cylinder corresponding to the present value of ENG SPEED. Thus, during the execution of SAFIRE indicated by 225, ENG SPEED has a value $S_{13}$ and CYLINDER has a value of 3.

After step 204, in a step 205 the value of STATE is examined and the program branches to one of steps 206, 207, 208 corresponding respectively to values of STATE of 0, 1 and 2.

In steps 206 and 207, a variable DITHER, which established the perturbation, is set to $+3.75°$ and, in step 208, DITHER is set to $-3.75°$. A value of DITHER of $-3.75°$ corresponds to an advanced or positive perturbation. After steps 206 and 208, the program jumps to a step 211 and, after 207, the program continues with a step 209.

In step 209, the variable SLOPE is calculated as ACCELERATION-ACCEL(CYLINDER). ACCEL(CYLINDER) corresponds to value of ACCELERATION during the previous execution of the module SAFIRE in which CYLINDER was given its present value. Thus, SLOPE represents the slope of engine output with respect to spark advance for the cylinder having the present value of CYLINDER. After step 219, the program continues with step 215.

In step 215 the sub-module LOOK UP TARGET SLOPE is called. This sub-module uses the value of SPEED INDEX, LOAD INDEX and MAP INT 0 to 3, which it receives from IGNLU, to calculate a variable TARGET SLOPE from target slope values stored in a memory. In step 216, a variable SLOPE ERROR is calculated as TARGET SLOPE-SLOPE.

In step 210, the sub-module MAP STORE is called. This module uses the recently calculated value of SLOPE ERROR together with the values of MAP INT 0 to 3, SPEED INDEX and LOAD INDEX, which it receives from the module IGNLU, to update the spark advance correction schedule 111. This is performed in the manner described with reference to FIG. 6. After step 210, the program continues with step 211.

In step 211, the sub-module LOOK UP CORRECTION is called. This sub-module calculates a variable CORRECTION which represents the appropriate correction to the spark advance angle from the values stored in the spark advance correction schedule. This variable is calculated by the interpolation method described with reference to FIG. 6.

Next, in step 212, a variable SPK ANG OPT is calculated as the sum of SPK ANG BASE and CORRECTION. SPK ANG OPT represents the optimum spark advance angle for the prevailing engine speed and load demand.

In a step 213, the variable SPK ANG, which represents the commanded value of the spark advance angle, is calculated as the sum SPK ANG OPT and the variable DITHER. Thus, either a positive or negative perturbation corresponding to $3.75°$ of crankshaft rotation is imposed on the optimum spark advance angle.

Lastly, in step 214, the variable ACCEL (CYLINDER) is set to the present value of ACCELERATION.

Returning to FIG. 5, the routine DWELL uses variables TOOTH, ENG SPEED and SPK ANG to calculate a variable COIL DRIVE which controls the generation of each spark. Specifically, COIL DRIVE causes the HIGH SPEED output of microcomputer 100 to go low when the engine crankshaft passes the commanded spark advance position and to go high early enough to allow the primary current in the ignition coil to reach the required value.

The response in engine speed to the perturbations of the spark advance angle falls with increasing engine speed above the resonant speed. To compensate for this, by way of modification, SLOPE can be multiplied by a variable proportional to engine speed and, hence, proportional to perturbation frequency. The overall signal to noise ratio does not change with engine speed as the majority of the noise is generated in the combustion process and consequently is also affected by the driveline response.

Although the above example describes applying perturbations to the spark advance angle in a spark ignition engine in order to obtain corrections to this parameter, the present invention is not limited to this application. For example, it could also be used to apply perturbations to the timing of fuel injection in either gasoline or diesel engines so as to provide corrections for this parameter. Also, in both gasoline and diesel engines, the air/fuel ratio is established in accordance with a predetermined schedule. The present invention could be used to apply perturbations to this ratio so as to obtain corrections to this parameter. In some diesel and in some gasoline engines, exhaust gases are mixed with engine intake air in a predetermined ratio so as to obtain a correction for this parameter.

In the example described above, the spark advance angle is perturbed and this same parameter is corrected in accordance with the slope measurements. However, the example could be modified so as to perturb one parameter and correct another parameter. For example, the spark advance could be perturbed and the slope measurements used to correct values in a schedule for the air/fuel ratio. The use of slope measurements to do this is described in European patent application No. 0,210,766.

In the system discussed with reference to FIGS. 4 to 7, there are provided a fixed spark advance schedule 110 and a spark advance correction schedule 111. By way of modification, there may be provided a single spark advance schedule which is initially provided with the fixed values. The values would then be updated in accordance with the slope measurement.

In another modification, a single memory location is provided for entire speed/load plane in place of the schedule 111.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art in view of this disclosure. Accordingly, the invention is not limited by the foregoing description, but is only limited by the scope of the appended claims.

What is claimed is:

1. An adaptive control system for an internal combustion engine having cylinders and at least one engine control parameter affecting an engine output, said control system comprising;
   (a) means for establishing a base value for an engine control parameter;
   (b) perturbation generation means for perturbing said an engine control parameter about said base value, said perturbation means comprising means for generating a perturbation waveform having a cycle comprising a first part and a second part and for applying a positive perturbation to said an engine control parameter during said first part of each said cycle and a negative perturbation to said an engine control parameter during said second part of each said cycle, said first part and said second part of said waveform having respective durations such that each cylinder of said engine experiences equal numbers of said positive perturbations and said negative perturbations compared with other cylinders irrespective of engine speed;
   (c) monitoring means for monitoring said engine output;
   (d) slope calculation means, responsive to said monitoring means, for calculating a slope of said engine output with respect to said an engine control parameter; and
   (e) correction means, responsive to said slope calculation means, for applying corrections to said at least one engine control parameter so as to obtain a desired value of said slope, wherein said engine has a drivetrain combination having at least one resonant frequency, and said perturbation waveform has a perturbation frequency greater than said resonant frequency of said drivetrain.

2. An adaptive control system for an internal combustion engine having cylinders and at least one engine control parameter affecting an engine output, said control system comprising;
   (a) means for establishing a base value for an engine control parameter;
   (b) perturbation generation means for perturbing said an engine control parameter about said base value, said perturbation means comprising means for generating a perturbation waveform having a cycle comprising a first part and a second part and for applying a positive perturbation to said an engine control parameter during said first part of each said cycle and a negative perturbation to said an engine control parameter during said second part of each said cycle, said first part and said second part of said waveform having respective durations such that each cylinder of said engine experiences equal numbers of said positive perturbations and said negative perturbations compared with other cylinders irrespective of engine speed;
   (c) monitoring means for monitoring said engine output;
   (d) slope calculation means, responsive to said monitoring means, for calculating a slope of said engine output with respect to said an engine control parameter; and
   (e) correction means, responsive to said slope calculation means, for applying corrections to said at least one engine control parameter so as to obtain a desired value of said slope, wherein said engine has n cylinders, each cycle of said perturbation waveform comprises m engine fires with q perturbations, m having a value which is less than 2 n, and a having a value which is a multiple of the highest common factor of n and m.

3. The system as in claims 1 or 2, wherein said means for establishing a base value is responsive to at least one engine operating condition.

4. The system as in claim 1 or 2, further comprising means for controlling said perturbation means to terminate perturbing said an engine control parameter when said speed of said engine is below a predetermined level.

5. The system as in claim 1 or 2, wherein said an engine control parameter and said at least one engine control parameter are the same control parameter.

6. The system as in claim 1 or 2, wherein said an engine control parameter and said at least one engine control parameter are different control parameters.

7. The system as in claim 2, wherein said engine includes a flywheel, a resilient shaft means connected to said flywheel, a gear means connected to said resilient shaft means, said flywheel, said resilient shaft means and said gear means forming a resonant system having a particular resonant frequency under normal driving conditions for each gear ratio established by said gear means and said perturbation waveform has a perturbation frequency greater than a particuar resonant frequency of said resonant system in a prevailing said gear ratio under normal driving conditions.

8. The system as in claim 1, wherein said engine has n cylinders, said one control parameter is an ignition timing parameter, said engine has a predetermined fire period, each said cycle comprises (i) m fire periods, and (ii) a perturbations of one of said positive perturbations and said negative perturbations and m minus a perturbations of the other of said positive perturbations and said negative perturbations, with a having a value which is a whole multiple of the highest common factor of n and m.

9. The system as in claim 8, wherein when a corresponds to positive perturbations a is less than or equal to m/2 and m is less than 2 n.

10. The system as in claim 1 or 2, further comprising means for measuring the engine fire period corresponding to each of said positive and negative perturbations, and said slope calculation means comprises means for calculating each slope value based on said engine fire periods.

11. The system as in claim 1 or 2, wherein said perturbation generation means comprises means for applying positive and negative perturbations to said an engine control parameter for each cylinder alternately.

12. The system as in claim 1 or 2, wherein said slope calculation means comprises means for calculating each slope value based on fire periods of a particular cylinder, said fire periods corresponding to both positive and negative perturbations.

13. The system as in claim 1 or 2, wherein said calculation means comprises means for calculating each slope value by (i) calculating a first value relating to a change in engine speed between a fire period of a particular cylinder corresponding to one of a positive perturbation and a negative perturbation and a first immediately preceding fire period, (ii) calculating a second value relating to a change in engine speed between a previous fire period of said particular cylinder corresponding to another perturbation of opposite polarity to said one of said positive perturbation and said negative perturbation and a second immediately preceding fire period, both said first immediately preceding fire period corresponding to said another perturbation of opposite polarity, and (iii) calculating said slope as a difference between said first value and said second value.

14. The system as in claim 1 or 2, wherein said at least one engine control parameter is an ignition timing parameter.

15. The system as in claim 14, wherein said ignition timing parameter is spark advance angle.

16. The system as in claim 14, wherein said ignition timing parameter is fuel injection timing.

17. The system as in claim 1 or 2, wherein said desired value of said slope has a negative value which is a function of at least one engine operating condition, so as to minimize undesirable exhaust emissions.

18. The system as in claim 17, wherein said negative value is a function of engine speed and load demand.

19. An adaptive control system for an internal combustion engine having an ignition timing control parameter affecting an engine output, said system comprising:
 (a) means for perturbing said ignition timing parameter about a base value;
 (b) means for monitoring said engine output;
 (c) means for calculating a slope of said engine output with respect to said engine timing parameter; and
 (d) means for controlling at least one engine control parameter affecting said engine output, so as to achieve a negative value of said slope during driving conditions, said negative value being a function of vehicle operating conditions.

20. The system as in claim 19, wherein said negative slope is a function of engine speed and load demand.

21. The system as in claim 19, wherein said ignition timing control parameter is spark advance angle.

22. The system as in claim 19, wherein said ignition timing control parameter is fuel injection timing.

23. An adaptive control system for an internal combustion engine having at least one engine control parameter affecting an engine output and having a flywheel, a resilient shaft means connected to said flywheel, a gear means connected to said resilient shaft means, said flywheel, said resilient shaft means and said gear means forming a resonant system having a particular resonant frequency for each gear ratio established by said gear means, said control system comprising:
 (a) a position transducer for producing reference pulses indicating rotational positions of a crank shaft of said engine;
 (b) control means, responsive to said position transducers, for providing a control output controlling an engine control parameter;
 (c) speed calculation means, responsive to said position transducer, for providing an output representing engine speed to said control means;
 (d) a load demand transducer for measuring a load demand on said engine;
 (e) a first memory for storing data representing said an engine control parameter as a function of engine speed and load demand;
 (f) an engine control parameter calculation device, responsive to said first memory, said speed calculation means and said load demand transducer, for calculating a base value for an engine control parameter based on prevailing engine speed and load demand;
 (g) a perturbation means for perturbing said an engine control parameter about said base value, said perturbation means comprising means for generating a perturbation waveform having a cycle comprising a first part and a second part and a perturbation frequency greater than a particular resonant frequency of said resonant system in a prevailing said gear ratio under normal driving conditions and applying a positive perturbation to said an engine parameter during said first part of each said cycle and a negative perturbation to said an engine control parameter during said second part of each said cycle, said first part and said second part of said waveform having respective durations such that each cylinder of said engine experiences equal numbers of said positive perturbations and said negative perturbations compared with other cylinders independently of engine speed;
 (h) speed change calculation means, responsive to said speed calculation means and said perturbation means, for calculating changes in engine speed when said an engine control parameter is perturbed by said perturbation means;
 (i) slope calculation means, responsive to said speed change calculation means, for calculating a slope of said engine speed with respect to said an engine control parameter;
 (j) target slope memory means for storing data representing target slope as a function of engine speed and load demand;
 (k) target slope calculation means, responsive to said target slope memory means, said speed calculation means and said load demand transducer, for calculating a target slope based on prevailing engine speed and load demand conditions;
 (l) comparison means for comparing said slope provided by said slope calculation means and said target slope provided by said target slope calculation means to determine a slope error;
 (m) correction memory updating means, responsive to said slope error, said engine speed calculation device and said load demand transducer, for providing a correction value for said first control input at prevailing engine speed and load demand;
 (n) a correction memory, responsive to said correction memory updating means, for storing correction values for said an engine control parameter as a function of engine speed and load demand;

(o) an engine control parameter correction calculation device, responsive to said correction memory, said speed calculation device and said load demand transducer, for calculating a correction value for said an engine control parameter at prevailing engine speed and load demand;

(p) a first summer for summing the outputs of said an engine control parameter calculation device and said an engine control parameter correction calculation device; and (q) a second summer for summing the outputs said first summer and said perturbation generator, the output of said second summer being provided to said control means for said an engine control parameter.

24. The system as in claim 23, further comprising means for causing said perturbation means to cease perturbing said an engine control parameter at engine speeds below a predetermined value.

25. The system as in claim 23, wherein said engine has n cylinders, said an engine control parameter is an ignition timing parameter, said engine has a predetermined fire period, each said cycle comprises (i) m fire periods, and (ii) a perturbations; with a having a value which is a whole multiple of the highest common factor of n and m.

26. The system as in claim 25, wherein the number of positive perturbations is less than or equal to m/2.

27. The system as in claim 23, further comprising means for measuring the engine fire period corresponding to each of said positive and negative perturbations, and said slope calculation means comprises means for calculating each slope value based on said engine fire periods.

28. The system as in claim 23, wherein said perturbation generation means comprises means for applying positive and negative perturbations to said control parameter for each cylinder alternately.

29. The system as in claim 23, wherein said slope calculation means comprises means for calculating each slope value based on fire periods of a particular cylinder, said fire periods corresponding to both positive and negative perturbations.

30. The system as in claim 23, wherein said calculation means comprises means for calculating each slope value by (i) calculating a first value relating to a change in engine speed between a fire period of a particular cylinder corresponding to one of a positive perturbation and a negative perturbation and a first immediately preceding fire period, (ii) calculating a second value relating to a change in engine speed between a previous fire period of said particular cylinder corresponding to another perturbation of opposite polarity to said one of said positive perturbation and said negative perturbation and a second immediately preceding fire period, both said first immediately preceding fire period and said second immediately preceding fire period corresponding to said another perturbation of opposite polarity, and (iii) calculating said slope as a difference between said first value and said second value.

31. The system as in claim 23, wherein said an engine control parameter is an ignition timing parameter.

32. The system as in claim 31, wherein said ignition timing parameter is spark advance angle.

33. The system as in claim 31, wherein said ignition timing parameter is fuel injection timing.

34. The system as in claim 23, wherein said an engine control parameter and said at least one engine control parameter are the same control parameter.

35. The system as in claim 23, wherein said an engine control parameter and said at least one engine control parameter are different control parameters.

36. The system as in claim 23, wherein said desired value of said slope has a negative value which is a function of engine operating conditions, so as to minimize undesirable exhaust emissions.

37. The system as in claim 36, wherein said negative value is a function of engine speed and load demand.

38. A method of operating an internal combustion engine having cylinders and at least one engine control parameter affecting an engine output, said control system comprising;

(a) determining a base value for an engine control parameter;

(b) perturbing said an engine control parameter about said base value in accordance with a waveform having a cycle comprising a first part and a second part, wherein a positive perturbation is applied to said an engine control parameter during said first part of each said cycle and a negative perturbation is applied to said an engine control parameter during said second part of each said cycle, said first part and said second part of said waveform having respective durations such that each cylinder of said engine experiences equal numbers of said positive perturbations and said negative perturbations compared with other cylinders irrespective of engine speed;

(c) monitoring said engine output;

(d) calculating a slope of said engine output with respect to said an engine control parameter; and (e) applying corrections, in response to the slope calculated in step (d), to said at least one control parameter so as to obtain a desired value of said slope, wherein said engine has a drivetrain combination having at least one resonant frequency, and said perturbation waveform has a perturbation frequency greater than said resonant frequency of said drivetrain.

39. A method of operating an internal combustion engine having cylinders and at least one engine control parameter affecting an engine output, said control system comprising;

(a) determining a base value for an engine control parameter;

(b) perturbing said an engine control parameter about said base value in accordance with a waveform having a cycle comprising a first part and a second part, wherein a positive perturbation is applied to said an engine control parameter during said first part of each said cycle and a negative perturbation is applied to said an engine control parameter during said second part of each said cycle, said first part and said second part of said waveform having respective durations such that each cylinder of said engine experiences equal numbers of said positive perturbations and said negative perturbations compared with other cylinders irrespective of engine speed;

(c) monitoring said engine output;

(d) calculating a slope of said engine output with respect to said an engine control parameter; and (e) applying corrections in response to the slope calculated in step (d), to said at least one control parameter so as to obtain a desired value of said slope, wherein said engine has n cylinders, each cycle of said perturbation waveform comprises m engine fires with a perturbations, m having a value which is less than 2 n, and a having a value which is a multiple of the highest common factor of n and m.

40. The method as in claim 38 or 39, wherein the step of determining a base value for said an engine control parameter is responsive to at least one engine operating condition.

41. The method as in claim 38 or 39, further comprising the step of terminating perturbing said an engine control parameter when said speed of said engine is below a predetermined level.

42. The method as in claim 38 or 39, wherein said an engine control parameter and said at least one engine control parameter are the same control parameter.

43. The method as in claims 38 or 39, wherein said an engine control parameter and said at least one engine control parameter are different control parameters.

44. The method as in claim 39, wherein said engine includes a flywheel, a resilient shaft means connected to said flywheel, a gear means connected to said resilient shaft means, said flywheel, said resilient shaft means and said gear means forming a resonant system having a particular resonant frequency under normal driving conditions for each gear ratio established by said gear means and said perturbation waveform has a perturbation frequency greater than a particular resonant frequency of said resonant system in a prevailing said gear ratio under normal driving conditions.

45. The method as in claim 38, wherein said engine has n cylinders, said one control parameter is an ignition timing parameter, said engine has a predetermined fire period, each said cycle comprises (i) m fire periods, and (ii) a perturbations of one of said positive perturbations and said negative perturbations and m minus a perturbations of the other of said positive perturbations and said negative perturbations, with a having a value which is a whole multiple of the highest common factor of n and m.

46. The method as in claim 45, wherein when a corresponds to positive perturbations, a is less than or equal to m/2 and m is less than 2 n.

47. The system as in claim 38 or 39, further comprising measuring the engine fire period corresponding to each of said positive and negative perturbations and wherein step (d) calculates each slope value based on said engine fire periods.

48. The method as in claim 38 or 39, wherein step (b) includes applying positive and negative perturbations to said an engine control parameter for each cylinder alternately.

49. The method as in claim 38 or 39, wherein step (d) includes calculating each slope value based on fire periods of a particular cylinder, said fire periods corresponding to both positive and negative perturbations.

50. The method as in claim 38 or 39, wherein step (d) includes calculating each slope value by (i) calculating a first value relating to a change in engine speed between a fire period of a particular cylinder corresponding to one of a positive perturbation and a negative perturbation and a first immediately preceding fire period, (ii) calculating a second value relating to a change in engine speed between a previous fire period of said particular cylinder corresponding to another perturbation of opposite polarity to said one of said positive perturbation and said negative perturbation and a second immediately preceding fire period, both said first immediately preceding fire period and said second immediately preceding fire period corresponding to said another perturbation of opposite polarity, and (iii) calculating said slope as a difference between said first value and said second value.

51. The method as in claim 38 or 39, wherein said at least one engine control parameter is an ignition timing parameter.

52. The method as in claim 51, wherein said timing parameter is spark advance angle.

53. The method as in claim 51, wherein said ignition timing parameter is fuel injection timing.

54. The method as in claim 38 or 39, wherein said desired value of said slope has a negative value which is a function of at least one engine operating condition, so as to minimize undesirable exhaust emissions.

55. The method as in claim 54, wherein said negative value is a function of engine speed and load demand.

56. A method of controlling an internal combustion engine having an ignition timing control parameter affecting an engine output, said method comprising:
(a) perturbing said ignition timing parameter about a base value;
(b) monitoring said engine output;
(c) calculating a slope of said engine output with respect to said engine timing parameter; and
(d) controlling at least one engine control parameter affecting said engine output, so as to achieve a negative value of said slope during driving conditions, said negative value being a function of vehicle operating conditions.

57. The method as in claim 56, wherein said negative slope is a function of engine speed and load demand.

58. The method as in claim 56, wherein said ignition timing control parameter is spark advance angle.

59. The method as in claim 56, wherein said ignition timing control parameter is fuel injection timing.

* * * * *